(12) United States Patent
Hamed et al.

(10) Patent No.: US 12,061,020 B2
(45) Date of Patent: Aug. 13, 2024

(54) HYDROGEN STORAGE DEVICE AND METHOD OF PRODUCING A HYDROGEN STORAGE DEVICE

(71) Applicant: H2GO POWER LTD, London (GB)

(72) Inventors: Enass Abo Hamed, London (GB); Luke Sperrin, London (GB); Kieran O'Donnell, London (GB)

(73) Assignee: H2GO POWER LTD, London (GB)

( * ) Notice: Subject to any disclaimer, the term of this patent is extended or adjusted under 35 U.S.C. 154(b) by 545 days.

(21) Appl. No.: 17/252,243

(22) PCT Filed: Jun. 14, 2019

(86) PCT No.: PCT/GB2019/051647
§ 371 (c)(1),
(2) Date: Dec. 14, 2020

(87) PCT Pub. No.: WO2019/239141
PCT Pub. Date: Dec. 19, 2019

(65) Prior Publication Data
US 2021/0180837 A1 Jun. 17, 2021

(30) Foreign Application Priority Data
Jun. 15, 2018 (GB) .................... 1809867

(51) Int. Cl.
*F25B 17/12* (2006.01)
*C01B 3/00* (2006.01)
*F28F 13/00* (2006.01)

(52) U.S. Cl.
CPC ............ *F25B 17/12* (2013.01); *C01B 3/0084* (2013.01); *F28F 13/003* (2013.01); *F28F 2250/08* (2013.01)

(58) Field of Classification Search
CPC ...... F25B 17/12; C01B 3/0084; F28F 13/003; F28F 2250/08
See application file for complete search history.

(56) References Cited

U.S. PATENT DOCUMENTS 4,165,569 A * 8/1979 Mackay ............... C01B 3/0005
34/416
4,187,092 A 2/1980 Woolley
(Continued)

FOREIGN PATENT DOCUMENTS

FR 2912666 A 8/2008
WO WO2017/117088 A1 7/2017

OTHER PUBLICATIONS

Afzal, et al., Heat transfer techniques in metal hydride hydrogen storage: A review, International Journal of Hydrogen Energy 42 (2017) pp. 30661-30682.

*Primary Examiner* — Raheena R Malik
(74) *Attorney, Agent, or Firm* — Stites & Harbison PLLC; Richard S. Myers, Jr.

(57) ABSTRACT

A hydrogen storage device is described. The hydrogen storage device comprises a heater/cooler module (6) and a pressure containment vessel (1) defining an interior volume and having within it: a thermally conducting network (4) having a face in thermal contact with the heater/cooler module (6), the shape of the thermally conducting network (4) being a fractal geometry in two or three dimensions; optionally a metal foam in thermal contact with the thermally conducting network (4); and a hydrogen storage material (5) in thermal contact with the thermally conducting network (4).

18 Claims, 9 Drawing Sheets

(56) References Cited

U.S. PATENT DOCUMENTS

| | | | | |
|---|---|---|---|---|
| 4,457,136 A * | 7/1984 | Nishizaki | C01B 3/0036 | 165/104.12 |
| 4,723,595 A * | 2/1988 | Yasunaga | C01B 3/0005 | 62/480 |
| 4,736,596 A * | 4/1988 | Iguchi | F25B 17/12 | 62/238.7 |
| 6,015,041 A * | 1/2000 | Heung | C01B 3/0005 | 423/658.2 |
| 6,638,348 B2 * | 10/2003 | Kuriiwa | C01B 3/0005 | 96/152 |
| 6,708,546 B2 * | 3/2004 | Myasnikov | C01B 3/0005 | 72/121 |
| 6,709,497 B2 * | 3/2004 | Myasnikov | B01D 53/0415 | 96/126 |
| 7,112,239 B2 * | 9/2006 | Kimbara | C01B 3/0005 | 96/108 |
| 7,185,483 B2 * | 3/2007 | Czachor | F28F 3/022 | 165/166 |
| 7,323,043 B2 * | 1/2008 | Finamore | H01M 8/04 | 206/0.7 |
| 7,326,281 B2 * | 2/2008 | Fujita | F28F 1/32 | 96/108 |
| 7,455,723 B2 * | 11/2008 | Voss | C01B 3/0005 | 96/126 |
| 7,491,448 B2 * | 2/2009 | Ovshinsky | C01B 3/0084 | 429/218.2 |
| 7,651,554 B2 * | 1/2010 | Tan | B82Y 30/00 | 96/108 |
| 7,771,512 B2 * | 8/2010 | Norton | C01B 3/001 | 502/526 |
| 8,636,836 B2 * | 1/2014 | Mudawar | F28F 1/12 | 165/104.19 |
| 8,778,063 B2 * | 7/2014 | Mudawar | C01B 3/0031 | 165/104.19 |
| 8,828,491 B2 * | 9/2014 | McAlister | C30B 31/00 | 427/248.1 |
| 8,980,416 B2 * | 3/2015 | McAlister | B32B 27/18 | 428/213 |
| 10,041,745 B2 * | 8/2018 | Poltorak | F28F 1/40 | |
| 11,125,392 B2 * | 9/2021 | Abd Elhamid | F17C 5/06 | |
| 11,209,220 B2 * | 12/2021 | Poltorak | F28F 21/02 | |
| 2002/0100369 A1 * | 8/2002 | Kuriiwa | C01B 3/0005 | 96/152 |
| 2003/0209149 A1 | 11/2003 | Myasnikov et al. | | |
| 2004/0241507 A1 * | 12/2004 | Schubert | B29C 48/345 | 429/102 |
| 2006/0245987 A1 * | 11/2006 | Schmidt | B01J 19/0093 | 422/198 |
| 2007/0151456 A1 * | 7/2007 | Ovshinsky | B22F 3/1103 | 96/108 |
| 2007/0227899 A1 * | 10/2007 | McClaine | B01J 8/20 | 205/637 |
| 2010/0236767 A1 * | 9/2010 | Toh | C01B 3/0026 | 165/182 |
| 2011/0005473 A1 * | 1/2011 | Ishikawa | C01B 3/0015 | 123/3 |
| 2011/0160042 A1 | 6/2011 | Tsao | | |
| 2011/0165061 A1 | 7/2011 | Yang et al. | | |
| 2011/0172087 A1 * | 7/2011 | Tsao | C01B 3/0021 | 502/185 |
| 2012/0201719 A1 * | 8/2012 | Jehan | C01B 3/0084 | 422/198 |
| 2017/0097197 A1 * | 4/2017 | Poltorak | F28F 1/40 | |
| 2018/0080609 A1 * | 3/2018 | Abd Elhamid | F17C 13/02 | |
| 2021/0180837 A1 * | 6/2021 | Hamed | C01B 3/0036 | |
| 2022/0178498 A1 * | 6/2022 | Sperrin | H01M 8/04708 | |
| 2022/0250762 A1 * | 8/2022 | Sperrin | B60L 50/72 | |
| 2022/0349527 A1 * | 11/2022 | Sperrin | C01B 3/0026 | |
| 2023/0212005 A1 * | 7/2023 | Sperrin | C01B 3/0015 | 423/651 |

* cited by examiner

Side-View
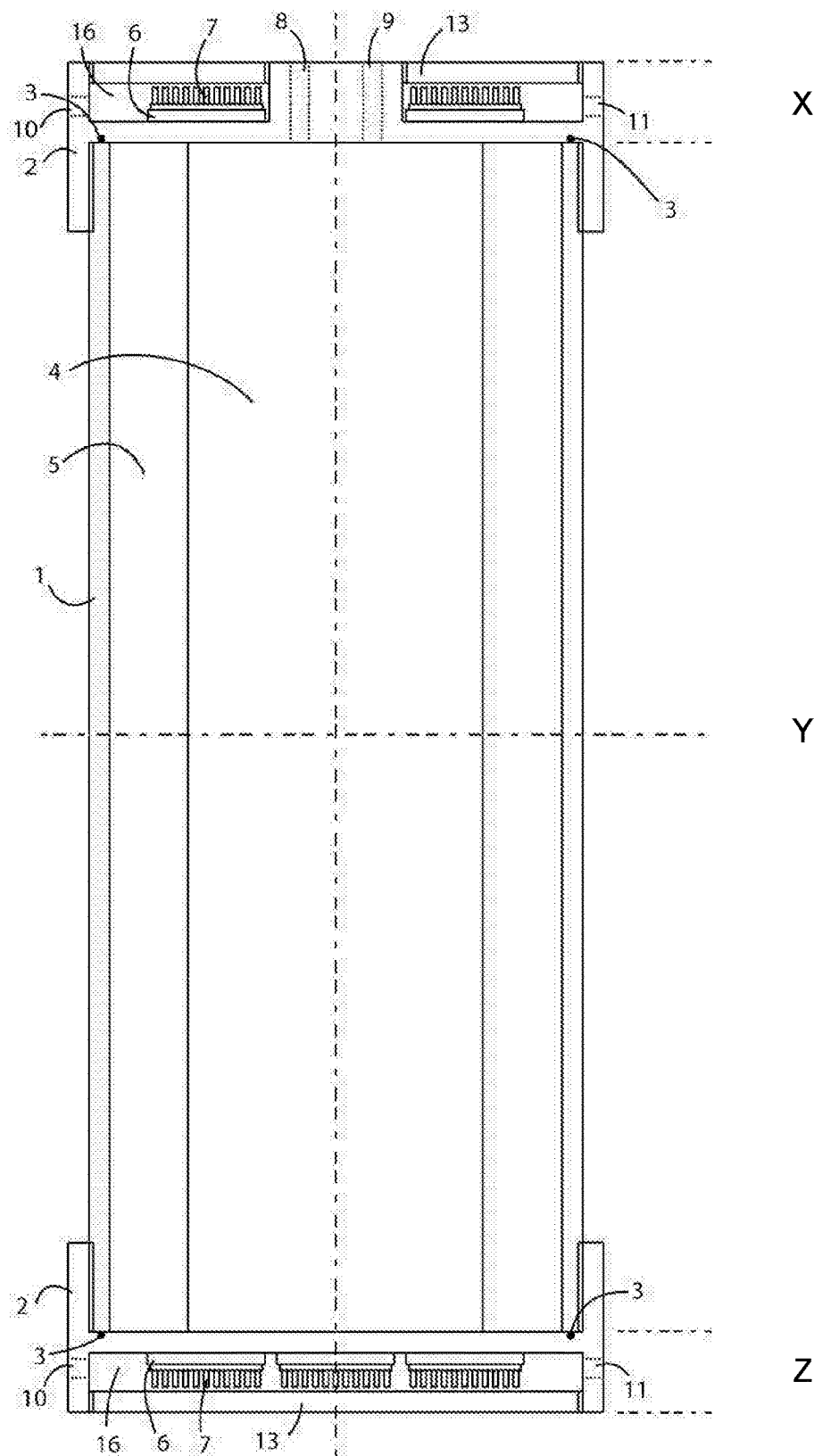
Drawing to scale |—50 mm—| Fig. 1

Cross-sectional slice X

Cross-sectional slice Y

Cross-sectional slice Z

HYDROGEN STORAGE DEVICE AND METHOD OF PRODUCING A HYDROGEN STORAGE DEVICE

CROSS REFERENCE TO RELATED APPLICATIONS

This application is a § 371 National State Application of PCT/GB2019/051647 filed Jun. 14, 2019, which claims priority to GB 1809867.3 filed Jun. 15, 2018.

FIELD

The present invention relates to hydrogen storage devices and methods of producing them. In particular, it relates to hydrogen storage devices that uses hydrideable metals or metal alloys to store hydrogen. Further, it relates to hydrogen storage devices that have especially efficient heat transfer during heating and cooling.

BACKGROUND

Hydrogen is an attractive alternative fuel to fossil fuels. While the world's oil reserves are rapidly being depleted, the supply of hydrogen remains virtually unlimited. Hydrogen can be produced from coal, natural gas and other hydrocarbons. Importantly, hydrogen can be produced without the use of fossil fuels, such as by the electrolysis of water using renewable energy. Hydrogen has a high density of energy per unit weight and is essentially non-polluting since the main product from burning hydrogen is water.

While hydrogen has wide potential application as a fuel, a major drawback in its utilization, especially in mobile uses such as the powering of vehicles, has been the lack of acceptable hydrogen storage medium. Conventionally, hydrogen has been stored in a pressure vessel under a high pressure or stored as a cryogenic liquid, being cooled to an extremely low temperature. Storage of hydrogen as a compressed gas involves the use of large and bulky vessels. Storage as a liquid presents a serious safety problem when used as a fuel for motor vehicles since hydrogen is extremely flammable. Liquid hydrogen is expensive to produce and it must be kept extremely cold, below −253° C.

Alternatively, certain metals and alloys permit reversible storage and release of hydrogen. In this regard, they have been considered as a superior hydrogen-storage material, due to their high hydrogen-storage efficiency, including low hydrogen loss during cycling and/or reduced heat loss between cycles (thermal efficiency). Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid.

Solid-phase metal or alloy systems can store large amounts of hydrogen by absorbing hydrogen with a high density and by forming a metal hydride under a specific temperature/pressure or electrochemical conditions, and hydrogen can be released by changing these conditions.

It is known that heat transfer capability can enhance or inhibit efficient exchange of hydrogen into and out of metal alloys useful in hydride storage systems, because during hydriding (also known as hydrogen absorption) an exothermic reaction occurs and during dehydriding (also known as hydrogen desorption) an endothermic reaction occurs. Therefore, moving heat within such systems or maintaining preferred temperature profiles across and through volumes of such storage materials becomes a crucial factor in metal alloy-metal hydride hydrogen storage systems. As a general matter, release of hydrogen from the crystal structure of a metal hydride requires input of some level of energy, normally heat. Placement of hydrogen within the crystal structure of a metal, metal alloy, or other storage system generally releases energy, normally heat, providing a highly exothermic reaction of hydriding or placing hydrogen atoms within the crystal structure of the hydrideable alloy.

The heat released from hydrogenation of hydrogen storage alloys must be removed. Heat ineffectively removed can cause the hydriding process to slow down or terminate. This becomes a serious problem which prevents fast charging. During fast charging, the hydrogen storage material is quickly hydrogenated and considerable amounts of heat are produced. The present invention provides for effective removal of the heat caused by the hydrogenation of the hydrogen storage alloys to facilitate fast charging of the hydride material. Approaches to this issue have been reported, for example in US 2003/0209149 and in "Heat transfer techniques in metal hydride hydrogen storage: A review", Afzal et al., *International Journal of Hydrogen Energy*, 2017, 42(52), 30661-30682.

The current invention provides an improved hydrogen storage device that addresses some of the shortfalls of the prior art.

SUMMARY

The present disclosure provides a hydrogen storage device comprising a heater/cooler module and a pressure containment vessel defining an interior volume and having within it:
  a thermally conducting network having a face in thermal contact with the heater/cooler module, the shape of the thermally conducting network being a fractal geometry in two or three dimensions;
  optionally a metal foam in thermal contact with the thermally conducting network; and
  a hydrogen storage material in thermal contact with the thermally conducting network.

The device of the invention is an especially efficient hydrogen storage device. In preferred embodiments, the device of the invention is compact and allows for rapid charging and discharging of hydrogen gas. Typically, heat is applied to discharge hydrogen gas, and heat is released and needs to be absorbed (i.e. cooling is applied) during the hydrogen charging phase. The device of the invention allows for rapid heating and cooling which means less heat is wasted to the surroundings during operation of the device, due to its short operation times. The device also allows for highly targeted heating of the system, which avoids unnecessary heat loss and associated wasted energy. In contrast to conventional pressure vessels for storage of compressed hydrogen gas, the pressure vessel is designed according to a relatively low operating pressure of at most 100 bar, preferably at most 75 bar, more preferably at most 50 bar, even more preferably at most 25 bar, most preferably at most 10 bar.

DETAILED DESCRIPTION

Figure 1:
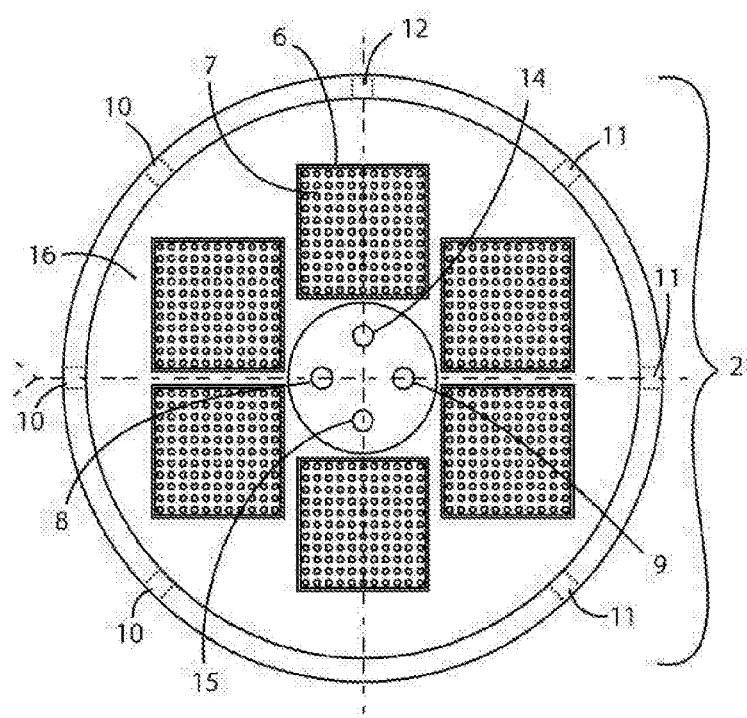
FIG. 1 shows a hydrogen storage device of the invention in a cylindrical geometry with a hydrogen containment volume, which includes the hydrideable metal/metal alloy, thermally conducting fractal network and metal foam, and end-caps with Peltier heating/cooling devices for heat transfer into or out of the device.
Figure 1:
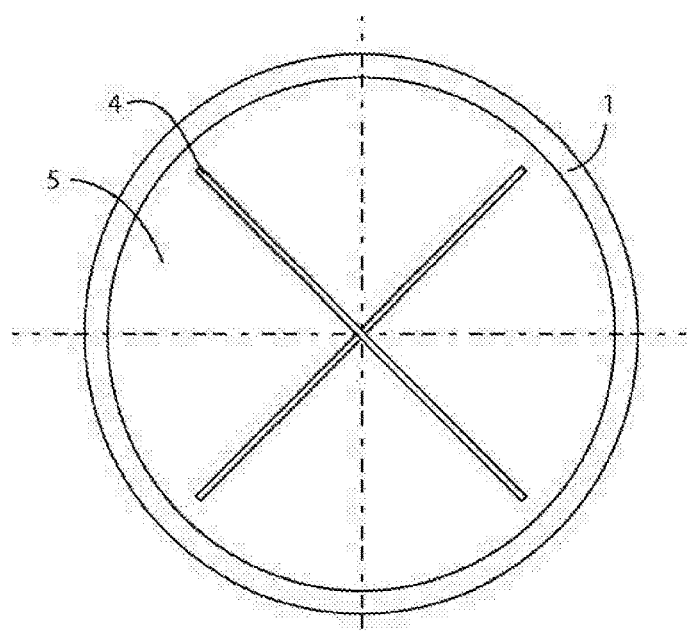
Figure 1:
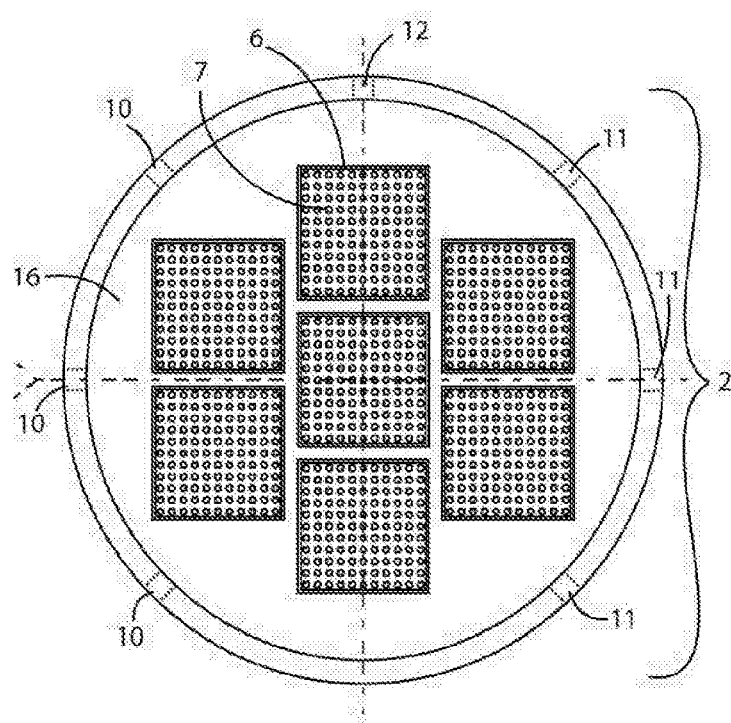
Figure 2A:
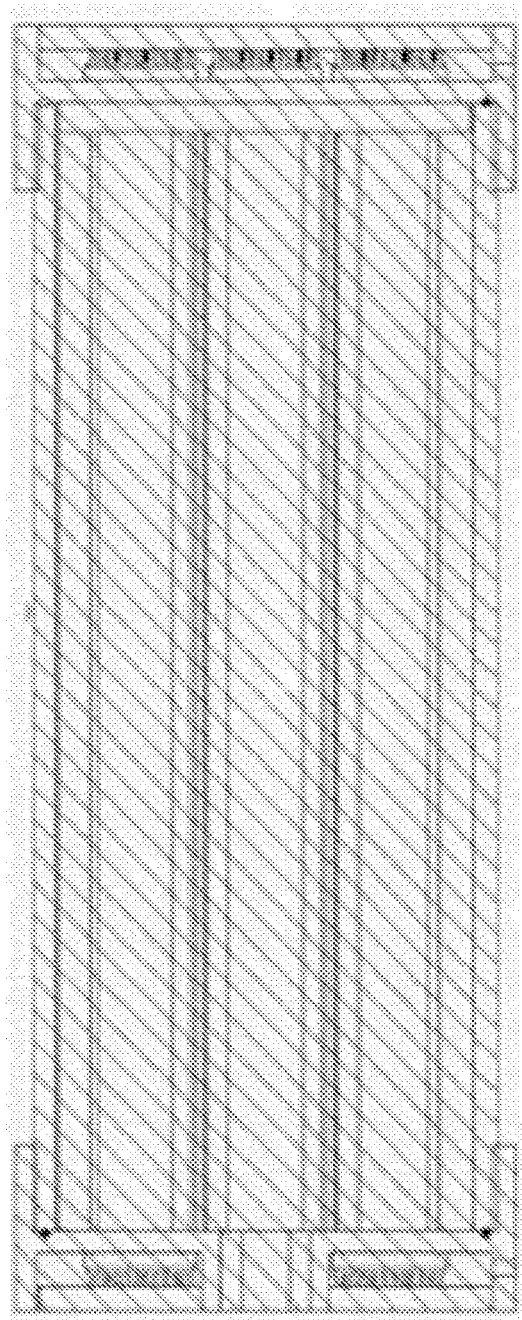
FIG. 2 shows devices of the invention in which the device has thermally conducting network in alternative fractal shapes.
Figure 2A:
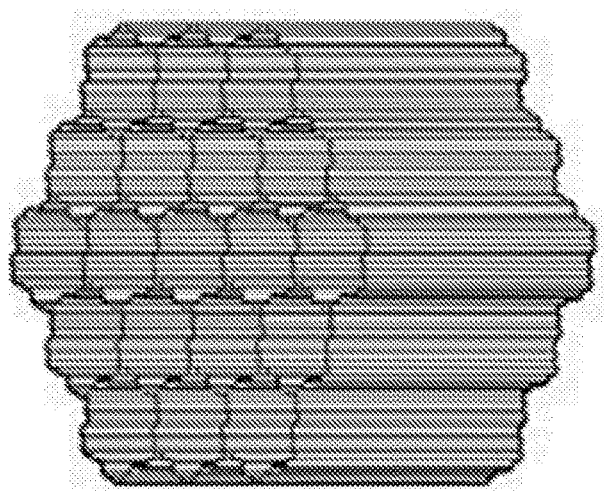
Figure 2A:
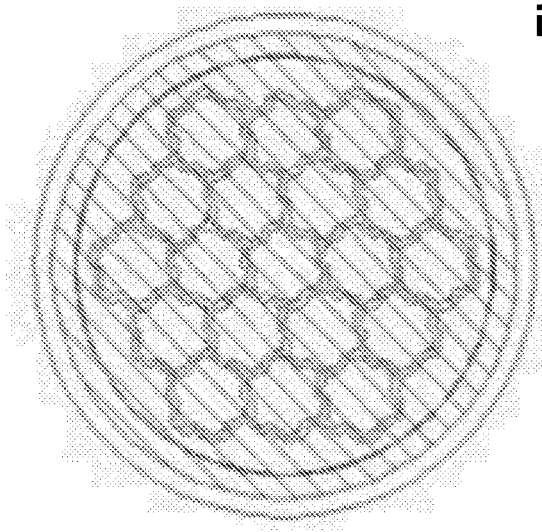
Figure 2B:
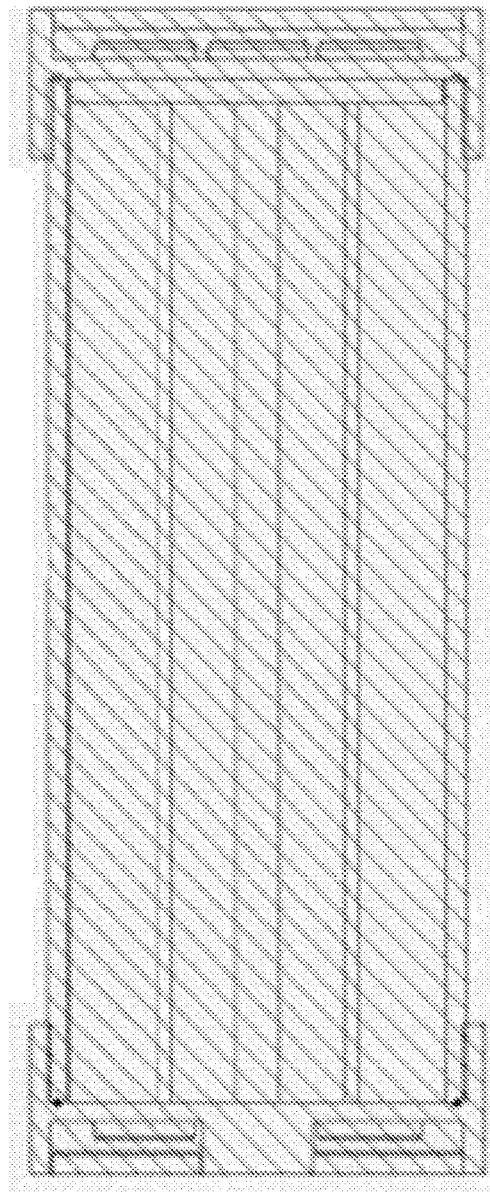
Figure 2B:
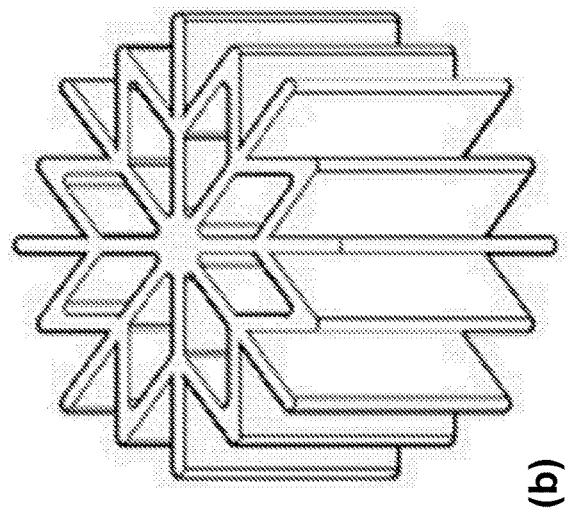
Figure 2B:
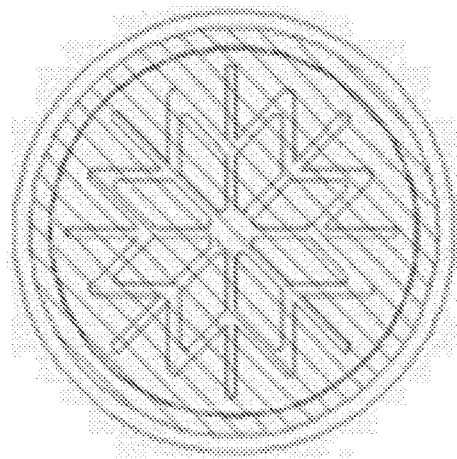
Figure 2C:
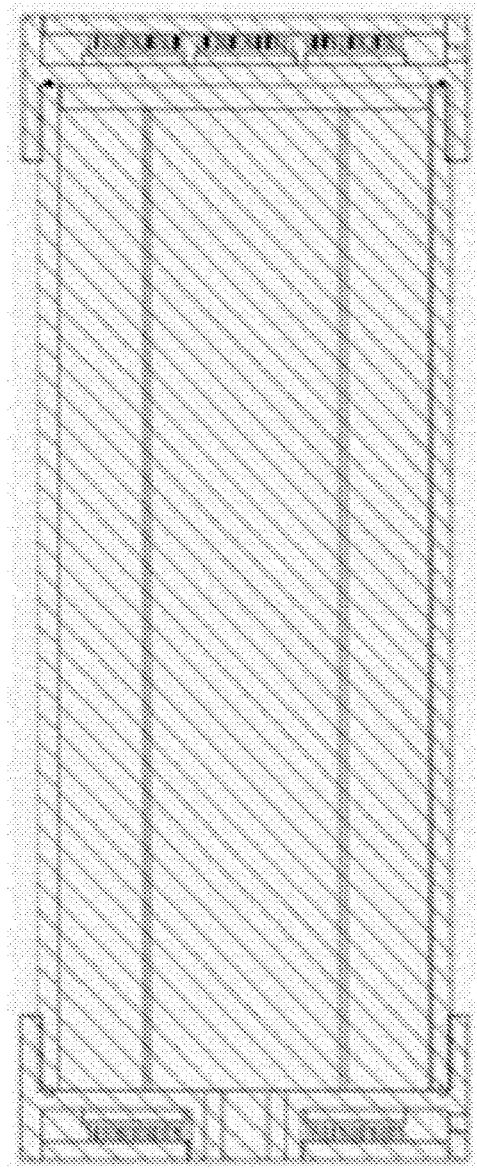
Figure 2C:
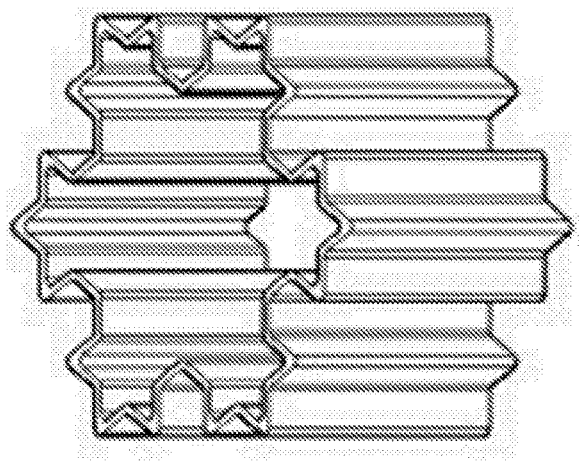
Figure 2C:
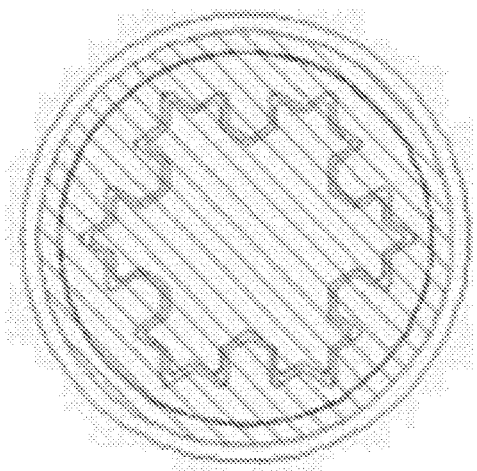

As mentioned above, the present invention provides an improved hydrogen storage device.

The device of the invention comprises a heater/cooler module. The heater/cooler module may be a thermoelectric heater and/or cooler. Alternatively, the heater can make use of Joule heating. Cooling can be carried out using a heat sink, optionally with active cooling by air propelled by a fan or by a cooling fluid (e.g. water) being propelled by a pump.

A thermoelectric heater and/or cooler may be a Peltier device or other device that makes use of thermoelectric cooling and heating. Devices of this type are commonly referred to as a Peltier heat pump, a solid state refrigerator, or a thermoelectric cooler (TEC). A thermoelectric heater and/or cooler device can be used together with a heat sink with optional active cooling (e.g. active cooling by air propelled by a fan or active cooling by a cooling fluid (e.g. water) being propelled by a pump). Application of heat or removal of heat on the side of the thermoelectric device that is not in thermal contact with the thermally conducting network enhances the ability of the thermoelectric device to heat and cool the thermally conducting network. It should be understood that while the thermally conducting network is described as having the face in thermal contact with the heater/cooler module, this may be provided by the thermally conducting network being integrally formed with the heater/cooler module such that the face is an internal face. For example, resistive heating wires for Joule heating may be embedded in the thermally conducting network. Alternative embodiments may not include a heater/cooler module.

In a device of the invention, the thermoelectric heater and/or cooler can, in a space-efficient manner enable heat to be removed from the hydrogen storage material during the hydrogen storage phase, and heat to be supplied to the hydrogen storage material during hydrogen release. Thermoelectric heater and/or cooler devices can be very closely controlled by an operator which enables a device of the invention to operate to a high degree of precision and short response times.

Suitable thermoelectric heater and/or cooler devices are known to the person skilled in the art and they are available commercially from most electronics suppliers, such as CUI Inc (https://www.cui.com/).

The thermally conducting network can be prepared from any suitable thermally conducting material. For example, it may be made of aluminium, copper, stainless steel or other suitable material that has good thermal conductivity. Preferred materials have good structural strength to maintain the structural integrity of the device. Preferred materials also do not react with hydrogen or a hydrogen storage material.

In a preferred embodiment, the thermally conducting network is produced by 3D printing. 3D printing allows for the fabrication of especially complex shapes with fine control and in three dimensions. Selective laser melting is a common method for 3D printing metals (especially Aluminium). In this process a high powder laser is used to heat the metal powder above its melting point. The melted powder is quickly cooled to solidify the metal. This process is repeated one layer at a time until the part is complete. Examples of metal additive manufacturing machines include EOSINT M290, EOSINT M280, EOSINT M270, DMC 835V and Agie Challenge V2, available for example from 3T RPD Ltd, of Fulton Court, Wofford Way, Greenham Business ParkNewbury, Berkshire, RG19 6HD, UK.

Alternatively, casting, injection moulding, milling, extrusion, or any other additive manufacturing process may be used.

The hydrogen storage device of the invention may have a metal foam attached to the thermally conducting network. It has been found that a metal foam can aid heat transfer to and from the hydrogen storage material. It is known that metal foams have a high internal surface area. Preferably, a metal foam in a device of the invention is an open celled metal foam, also called metal sponge. Open cell metal foams are generally manufactured by foundry or powder metallurgy. In the powder method, "space holders" are used; they occupy the pore spaces and channels. In casting processes, foam is cast with an open-celled polyurethane foam skeleton.

Surprisingly, the hydrogen storage material can be placed in the spaces in the metal foam and it retains its ability to store hydrogen whilst at the same time benefiting from the enhanced rate of thermal transfer brought about by the high surface area of the foam. For example, the metal foam is a foam of aluminium, copper, stainless steel, nickel or zinc (or combination alloys including those metals). Aluminium foam is especially preferred.

The hydrogen storage material in the device of the invention can be a compound that is a metal hydride. Typically, the elemental metal reacts with hydrogen to form a metal hydride, for example:

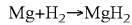
$$Mg+H_2 \rightarrow MgH_2$$

In many cases, the reaction is driven to the right by the use of high pressure.

Release of hydrogen occurs when heat is applied to the hydride. For example, for magnesium hydride and at 1 bar of pressure, the compound decomposes to the metal and hydrogen at 287° C.:

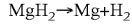
$$MgH_2 \rightarrow Mg+H_2$$

In a hydrogen storage device of the invention, the hydrogen storage material may comprise one or more selected from: a metal for example an alkaline metal, an alkaline earth metal and/or a transition metal; and/or a hydride salt of a metal for example a hydride salt of an alkaline metal, an alkaline earth metal and/or a transition metal and/or a complex salt thereof; and/or a borohydride salt of a metal for example an alkaline metal, an alkaline earth metal and/or a transition metal; and/or a borohydride salt of ammonium and/or alkyl ammonium; and/or mixtures thereof. In a hydrogen storage device of the invention, the hydrogen storage material may comprise an ABx alloy, wherein A is at least one selected from a group consisting of La, Ce, Pr, Nd, Ca, Y, Zr, and Mischmetal, wherein B is at least one selected from a group consisting of Ni, Co, Mn, Al, Cu, Fe, B, Sn, Si, Ti, and x is in a range from 4.5 to 5.5. In a hydrogen storage device of the invention, the hydrogen storage material may comprise an $AB/A_2B$ alloy, wherein A is at least one selected from a group consisting of Ti and Mg, and B is at least one selected from a group consisting of Ni, V, Cr, Zr, Mn, Co, Cu, and Fe. In one example, the hydrogen storage material comprises an AB2 alloy, wherein A is at least one selected from a group consisting of Ti, Zr, Hf, Th, Ce and rare earth metals, and B is at least one selected from a group consisting of Ni, Cr, Mn, V, Fe, Mn and Co. In one example, the hydrogen storage material comprises an $AB_x$ alloy, an $AB/A_2B$ alloy, an $AB_2$ alloy, a hydride and/or a mixture thereof, as described above and/or below. In one example, the hydrogen storage material comprises at least one selected from a group consisting of Pd, Pt, Ni, Ru, and Re. In one example, the hydrogen storage material comprises one or more metal hydrides selected from a group consisting of: lithium hydride (LiH), sodium hydride (NaH), potassium hydride (KH), beryllium hydride ($BeH_2$), magnesium hydride ($MgH_2$), calcium hydride ($CaH_2$), strontium hydride ($SrH_2$), titanium hydride ($TiH_2$), aluminum hydride ($AlH_3$), boron hydride ($BH_3$), lithium borohydride (LiBH4), sodium borohydride ($NaBH_4$), magnesium borohydride ($Mg(BH_4)2$), calcium borohydride ($Ca(BH4)2$), lithium alanate (LAlN, sodium alanate ($NaAlH_4$), magnesium alanate ($Mg(AlH_4)_2$), calcium alanate ($Ca(AlH_4)_2$), and mixtures thereof. In a hydrogen storage device of the invention, the hydrogen storage material may be a metal hydride selected from $MgH_2$, $NaAlH_4$, $LiAlH_4$, LiH, $LaNi_5H_6$, $TiFeH_2$, palladium hydride, $LiNH_2$, $LiBH_4$ and $NaBH_4$. $MgH_2$, $NaAlH_4$, $LiAlH_4$, LiH and $LaNi_5H_6$ are especially preferred. In one example, the hydrogen storage material comprises a mixture of two or more of these metal hydrides. These different metal hydrides may have different storage and/or release rates. Hence, a mixture of two or more of these metal hydrides may be selected for desired storage and/or release rates, for example under different conditions, and/or to provide relatively more constant storage and/or release rates under different conditions. In one example, the hydrogen storage material comprises a dopant such as a catalyst and/or an additive. For example, Ti and/or Zr may be used as catalytic dopants to improve kinetics of hydrogen storage and/or release, such as of sodium alanate. Although alkali metal alanates were known as non-reversible 'chemical hydrides', catalysed reversibility offers the possibility of a new family of low-temperature hydrides. For example, the alkali metal alanate-complex hydride, $NaAlH_4$, readily releases and absorbs hydrogen when doped with a $TiCl_3$ or Ti-alkoxide catalysts. There is currently ongoing research looking into optimisation of these catalysts in terms of their type, doping process and mechanistic understanding. Generally any appropriate transition or rare-earth metal can be used as catalysts, for example Ti, Zr, V, Mn, Fe, Ni, Co, Cr, Nb, Ge, Ce, La, Nd, Pd, Pr, Zn, Al, Ag, Ga, In and/or Cd. Additives include C, which improves thermal transfer of the hydrogen storage material. Preferably, the hydrogen storage material is a powder form, for example particles of less than 0.5 mm cross-section, for example less than 0.3 mm cross-section, for example less than 0.1 mm cross-section. In some embodiments, the particles have a cross-section above 1 μm, for example more than 5 μm, for example more than 10 μm, for example more than 20 μm, such that they have a cross section in the range 1 μm to 500 μm, for example 5 μm to 500 μm, for example 10 μm to 200 μm, for example 20 μm to 200 μm. In alternative embodiments, the particles are nano particles, that is to say particles that have a cross-section in the range 1 to 500 nm, for example 5 to 500 nm, for example 10 to 500 nm, for example 20 to 200 nm. In certain embodiments, the particles can be a mixture of particles of different sizes, for example a mixture of particles of micrometer scale size and particles of nanometer scale size. In this way, a packing efficiency for example a density and/or a surface area of the particles may be increased, thereby increasing storage of hydrogen and/or a rate of storage of hydrogen respectively. In certain embodiments, the hydrogen storage material is processed, for example by attrition such as ball milling, to reduce a particle size thereof and/or a particle size distribution thereof and/or to incorporate a dopant and/or an additive.

If a foam is present, then the foam pore size is larger than the particle size. Preferably, the ratio of the pore size to the particle size is at least 5:1, for example at least 10:1, for example 20:1. (size being the measurement in one dimension)

In a hydrogen storage device of the invention, the thermally conducting network preferably has a fractal geometry. A fractal geometry me be fractal in two dimensions or in three dimensions, for example in two dimensions. It has been found that the fractal geometry provides an especially high surface area to volume ratio, which enables especially efficient heat transfer to and from the hydrogen storage material. Fractal geometry is a pattern that displays self-similarity on all scales. For example, the fractal geometry may be selected from a Gosper Island, a 3D H-fractal, a Quadratic Koch Island, a Quadratic Koch surface, a Von Koch surface, a Koch Snowflake, a Sierpinski carpet, a Sierpinski tetrahedron, a Mandelbox, a Mandelbulb, a Dodecahedron fractal, a Icosahedron fractal, a Octahedron fractal, a Menger sponge and a Jerusalem cube.

Certain fractals allow for a plurality of individual repeat unit blocks to be fabricated and then assembled together in a tessellation (i.e. assembled together with no overlaps or gaps). This is especially beneficial in a device of the invention as it enables there to be a plurality of channels through the device, whereby each channel has a high surface area, is of the same construction but does not leave wasted space between the repeat units. Gosper island is an example of such a fractal.

In a device of the invention, the heater/cooler module (e.g. a thermoelectric heater and/or cooler) is in thermal contact with the thermally conducting network. As the two are in thermal contact, heat can efficiently be passed from one to the other. The heat can pass in either direction—heating the thermally conducting network or cooling it. The contact between the heater/cooler module and the thermally conducting network need not be direct physical contact. In some embodiments, there are intervening materials, such as a wall of the hydrogen containment vessel. In such an embodiment, the intervening material must continue to allow for good thermal contact between the heater/cooler module and the thermally conducting network, such that heat can pass efficiently from one to the other.

The thermally conducting network preferably contains metal foam in the spaces in the network. The voids in the metal foam contain the hydrogen storage material. It has been found that the metal foam in the fractal network provides excellent transfer of heat to and from the thermoelectric heater/cooler and the hydrogen storage material.

The device of the invention comprises a pressure containment vessel. The vessel is preferably constructed from a container having a cylindrical shape. Vessels having alternative shapes may also be used, depending on the limitations imposed by the use to which the device is to be put. For example, it may be cuboid, for example a square based prism. Cuboids have the advantage that they are readily stackable and they can thus be stored in a compact manner.

In one embodiment, a device of the invention comprises one or more of the thermoelectric heater and/or coolers on a base to provide a Peltier heater/cooler assembly. The thermally conducting network is in thermal contact with the heater/cooler assembly. The heater/cooler assembly is, for example, attached to it. For example, the thermally conducting network may be 3D printed onto the heater/cooler assembly. Optionally, metal foam may be attached to the thermally conducting network. It may be attached by the application of an appropriate amount of compression. Alternatively, the foam may be attached by a physical bond for example by soldering the network and foam together. In such an arrangement, it is preferred for the solder to have high thermal conductivity, which is the case for most solder materials.

The pressure containment vessel is completed by the addition of a lid, which when in contact with the base forms a sealed vessel around the thermally conducting network. The vessel may have one or more openings to allow hydrogen to enter and exit the vessel. Generally, there is a valves in the opening or openings. Each valve is movable between an open position in which hydrogen can enter or exit the vessel, and a closed position in which and the vessel is sealed. The heater/cooler may be positioned inside the pressure containment vessel, or it may be outside of the pressure containment vessel. Having the heater/cooler outside the pressure containment vessel simplifies certain aspects of the assembly of the device and allows simpler access for electrical wiring.

The hydrogen storage material is advantageously added (generally in powder form) before the lid is attached. Typically it is in powder form and it is poured between the network arms (optionally into the foam, if a foam is used). This is generally carried out in an inert atmosphere environment, such as under argon, or other inert gas. Depending on the scale of manufacture, this may be carried out in a glove box. Slight agitation can be advantageous, to ensure the powder percolates through the foam. Then the lid is attached.

The power supply can be in a variety of forms, for example a battery, fuel cell output or flow battery output. Generally, at least one thermocouple is present in the system and connected to the thermoelectric heater/cool (or heater and cooler) via a PID (proportional-integral-derivative) control.

The device can be operated in various ways known to the person skilled in the art. Upon receiving a signal from the hydrogen source (for example an electrolyser) indicating that hydrogen is being provided, the valve to the reactor (initially in its fully discharged state) is opened. When the hydrogen comes into contact with the hydrogen storage material, the temperature of the vessel increases due to the exothermic absorption reaction. A thermocouple (or other suitable temperature sensor) detects temperature rise and prompts activation of the cooler (for example of a thermoelectric device in the vessel). For example, the cooler may be deactivated once set low temperature is reached (for example 20° C.). The reactor valve is then closed once the pressure stabilises at predetermined pressure is reached (for example 10 bar).

For a desorption step, essentially the reverse process is carried out. A signal from fuel cell (or the hydrogen consumer) is received indicating that hydrogen is required. The valve from the reactor (initially fully charged) is opened and hydrogen gas begins to be released. The temperature decreases due to the endothermic desorption. A, thermocouple (or other suitable temperature sensor) detects the fall in temperature, and prompts activation of the heater (for example of a thermoelectric device in the vessel). For example, the heater may be deactivated once set temperature high temperature is reached (for example 80° C.). The reactor valve is then closed once the pressure stabilises at predetermined pressure is reached (for example 1 bar).

The device of the invention finds use in various applications. The invention thus further provides a power-utilising item (for example a vehicle, for example a car) containing a hydrogen storage device of the invention.

EXAMPLES

The following Examples illustrate the invention.

Example 1: Hydrogen Storage Device

An example of hydrogen storage device of the invention is shown in FIG. 1. The device comprises a hollow metal cylinder (outer cylindrical vessel wall (1)) and along with two metallic end-caps (2), it forms the hydrogen gas containment volume. Inside this volume exists the hydrideable metal/metal alloy (5), an aluminium fractal structure (4) with metallic foam in contact with it (not shown in figure). Both end-caps (2) contain an internal cavity for the location of multiple Peltier devices (6) and heat/cold sinks (7). In the outer cylindrical vessel wall (1), there are three gas inlets (10) and three gas outlets (11) which allow for heating/cooling gas (air) access to this internal cap cavity to add/remove heat. There is also an electronics entry/exit point (12) in the outer cylindrical vessel wall (1). In one of the end-caps four ports (holes) are included, allowing access to the hydrogen containment volume; they are a hydrogen gas inlet (8), a hydrogen gas outlet (9), a pressure sensor connection (15) and a temperature sensor connection (14). The end-caps are held in place and form a seal through a thread and o-ring arrangement (3). The end-caps can be removed for easy access to the hydrogen containment volume. The end-caps have covers (13) which can be removed for easy access to the heating/cooling gas containment volume within them.

Example 2: Structure Shapes for Thermally Conducting Network

In FIG. 2 there are shown three alternative fractal networks for the thermally conducting network mounted inside the reactor design shown in FIG. 1. The 2D radially symmetric fractal patterns extend in the vertical dimension. On the right hand side of the figure, there are shown the length cross-sections. In the center of the figure are the radial cross-sections taken halfway along the length. On the left hand side of the figure are 3D interpretations of the fractal network itself. (a) Gosper Island (b) 'Snowflake' design (c) Koch Snowflake.

Example 3: Metal Foam Constructions

Figure 3A:
FIG. 3 shows a metal foam with void spaces suitable for accommodating metal hydride.

FIG. 3a shows void spaced in a metal foam. The aluminium foam is produced from 6101 Aluminium alloy, retaining 99% purity of the parent alloy. It has a reticulated structure; the cells are open and have a dodecahedral shape. Other properties include: 0.2 g/cm3 bulk density, 93% porosity, 8 pores/cm.

Figure 3B:
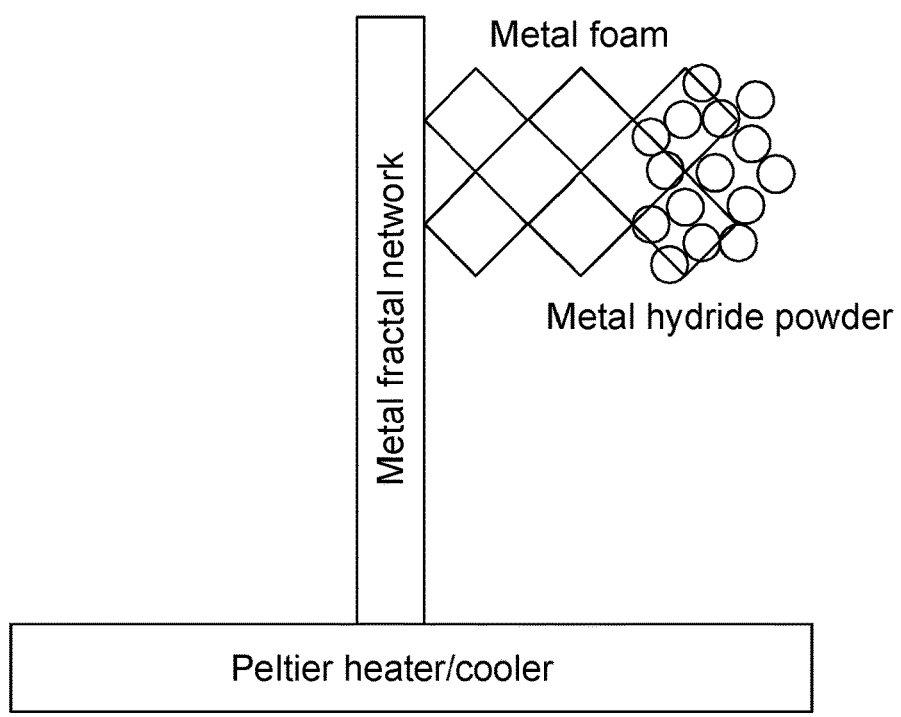

In FIG. 3b, there is shown schematically how a metal hydride powder is attached to a metal foam which in turn is connected to a metal thermally conducting fractal network.

Example 4: Compact Design of Hydrogen Storage Device

Figure 4:
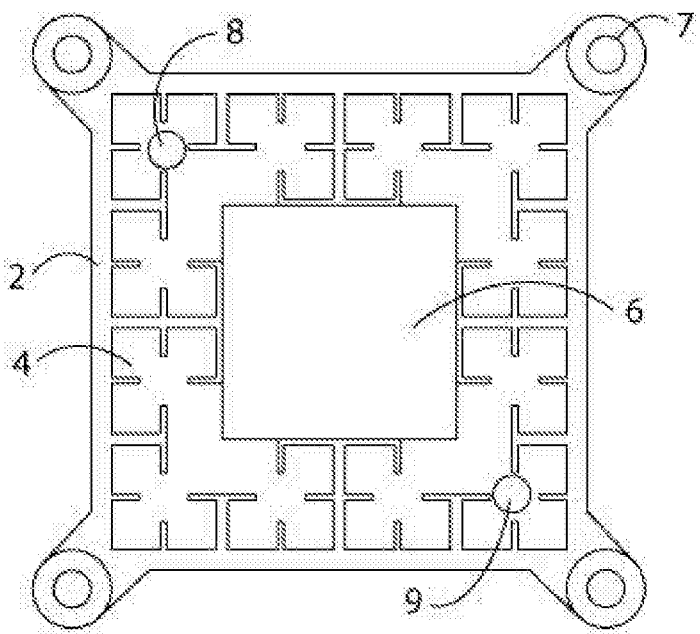
FIG. 4 shows a compact design of hydrogen storage device.
Figure 4:
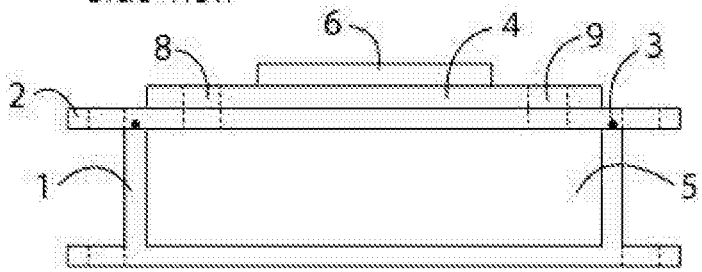

FIG. 4 shows a compact design of a hydrogen storage device of the invention. The device shown in FIG. 4 comprises a hydrogen gas containment volume formed from a cuboid-based container vessel (1) with square-planar lid (2). The lid (2) is secured through the use of four axial-corner screws in screw fixings (7) and it is sealed by an O-ring (3) positioned between the vessel (1) and the lid (2). The hydrogen containment volume has within it a hydrideable metal/metal alloy (5) and metal foam (not specifically shown). On one surface there is a flat square-based metal fractal (4). That fractal acts to dissipate heat radially. On-top of this a Peltier device (6) acts as a heat/cool source. Two holes (8) and (9) located through the lid and fractal act as a hydrogen gas inlet (8) and outlet (9).

The invention claimed is:

1. A hydrogen storage device comprising a heater/cooler module and a pressure containment vessel defining an interior volume and having within it:
   a thermally conducting network having a face in thermal contact with the heater/cooler module, the shape of the thermally conducting network being a fractal geometry in two or three dimensions;
   and
   a hydrogen storage material in thermal contact with the thermally conducting network.

2. A hydrogen storage device as claimed in claim 1 in which the heater/cooler module is a thermoelectric heater and cooler.

3. A hydrogen storage device as claimed in claim 2 in which the thermoelectric heater and cooler is a Peltier device.

4. A hydrogen storage device as claimed in claim 1 in which the thermally conducting network is made of aluminum, copper, stainless steel or other suitable material that has good thermal conductivity and does not react with hydrogen or a hydrogen storage material.

5. A hydrogen storage device as claimed in claim 1 in which the thermally conducting network is produced by 3D printing.

6. A hydrogen storage device as claimed in claim 1, further comprising a metal foam in thermal contact with the thermally conducting network, wherein the metal foam is a foam of aluminum, copper, stainless steel, nickel or zinc.

7. A hydrogen storage device as claimed in claim 1 in which the hydrogen storage material is a metal hydride.

8. A hydrogen storage device as claimed in claim 7 in which the metal hydride is selected from $MgH_2$, $NaAlH_4$, $LiAlH_4$, $LiH$, $LaNi_5H_6$, $TiFeH_2$, palladium hydride, $LiNH_2$, $LiBH_4$ and $NaBH_4$.

9. A hydrogen storage device as claimed in claim 1 in which the fractal geometry is selected from a Quadratic Koch Island, a Quadratic Koch surface, a Von Koch surface, a Koch Snowflake, a Sierpinski carpet, a Sierpinski tetrahedron, a Mandelbox, a Mandelbulb, a Dodecahedron fractal, a Icosahedron fractal, a Octahedron fractal, a Menger sponge, a Jerusalem cube, and a 3D H-fractal.

10. A hydrogen storage device as claimed in claim 1 in which the heater/cooler module includes a heat sink.

11. A hydrogen storage device as claimed in claim 1 which further contains hydrogen.

12. A hydrogen storage device as claimed in claim 1, further comprising a metal foam in thermal contact with the thermally conducting network.

13. A hydrogen storage device as claimed in claim 10, in which the heat sink has active cooling by air propelled by a fan or by a cooling fluid being propelled by a pump.

14. A hydrogen storage device as claimed in claim 13, wherein the cooling fluid is water.

15. A method of storing hydrogen which comprises a step of passing hydrogen gas into a device as claimed in claim 1.

16. A method as claimed in claim 15 in which further comprises applying cooling to the device during the hydrogen addition step.

17. A method of providing hydrogen which comprises a step of releasing hydrogen gas from a device as claimed in claim 1.

18. A method as claimed in claim 17 in which further comprises applying heating to the device during the hydrogen release step.

\* \* \* \* \*